Jan. 27, 1925.
M. F. BROGAN
1,524,166
MACHINE FOR INSERTING FASTENINGS
Original Filed Jan. 9, 1918    6 Sheets-Sheet 4
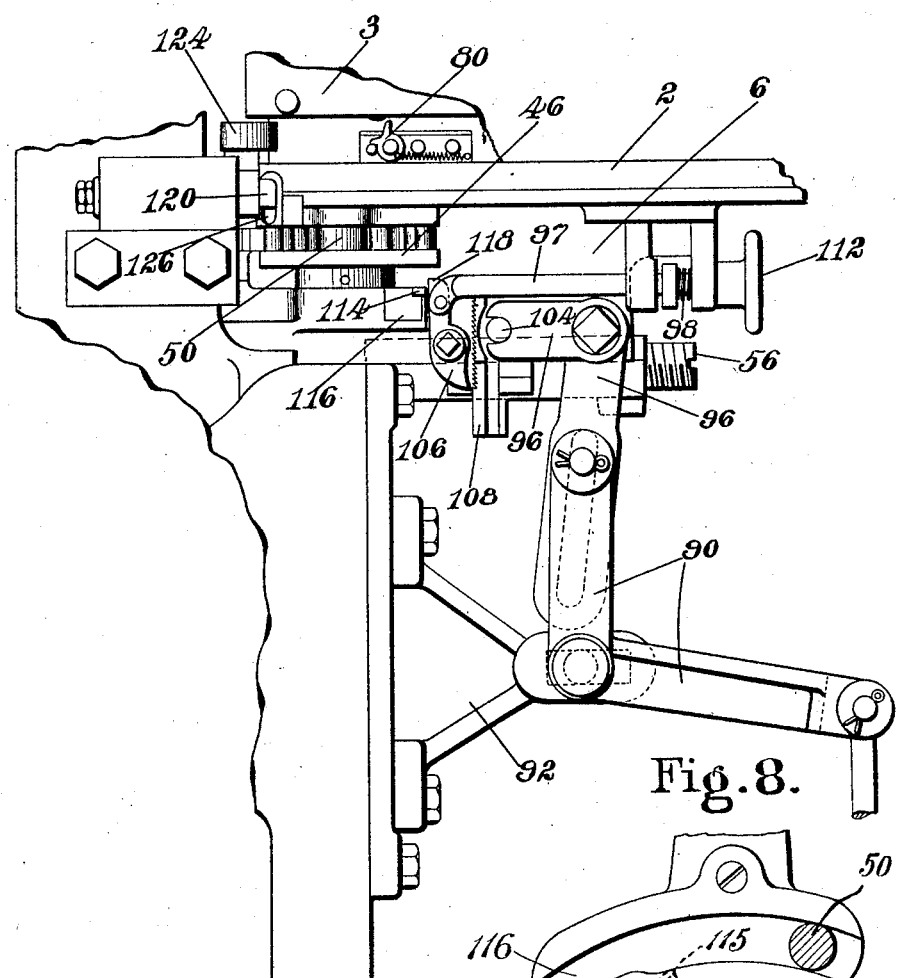
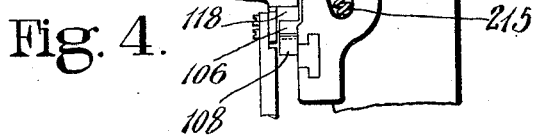
INVENTOR.
Michael F. Brogan Jan. 27, 1925. 1,524,166
M. F. BROGAN
MACHINE FOR INSERTING FASTENINGS
Original Filed Jan. 9, 1918 6 Sheets-Sheet 5

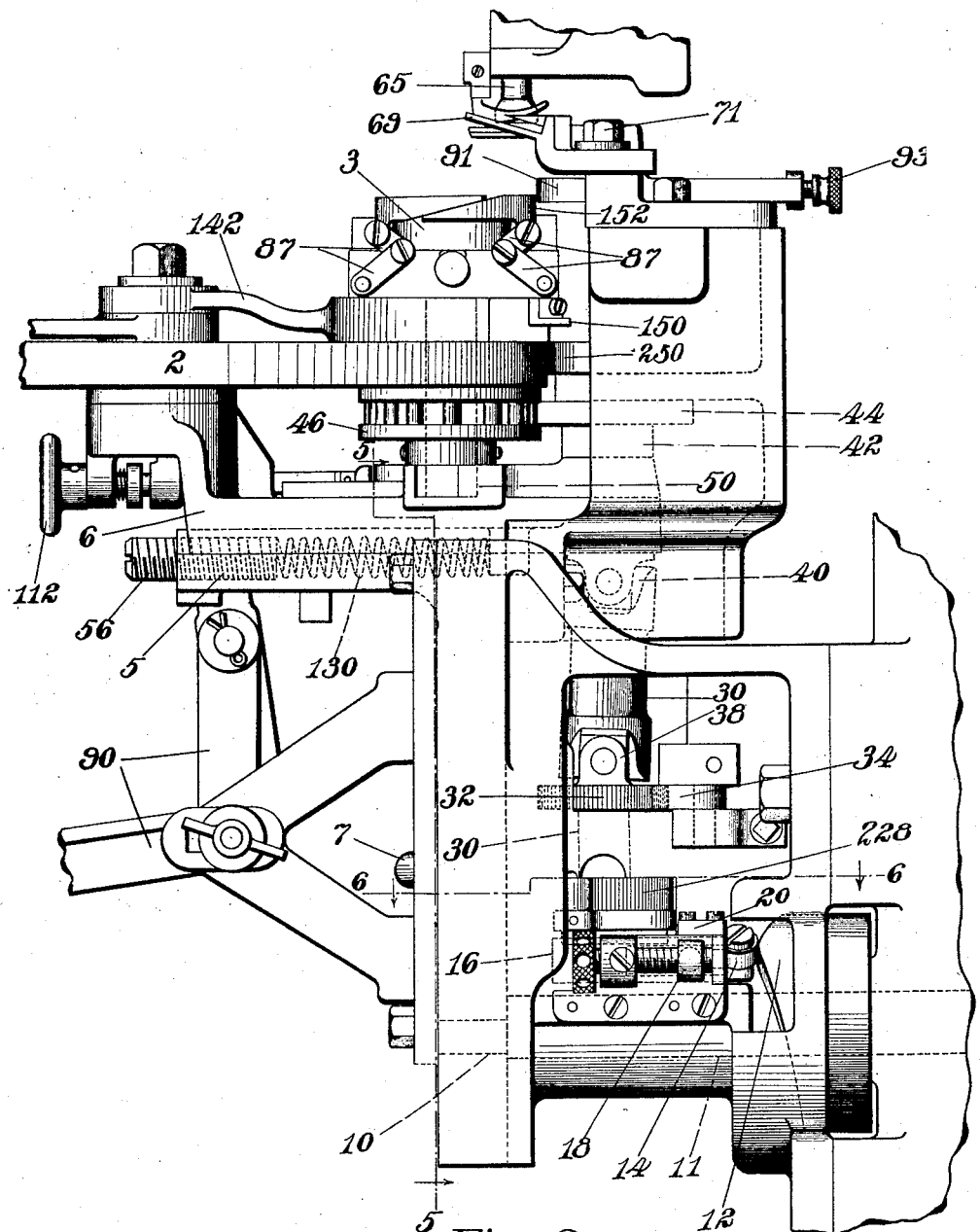

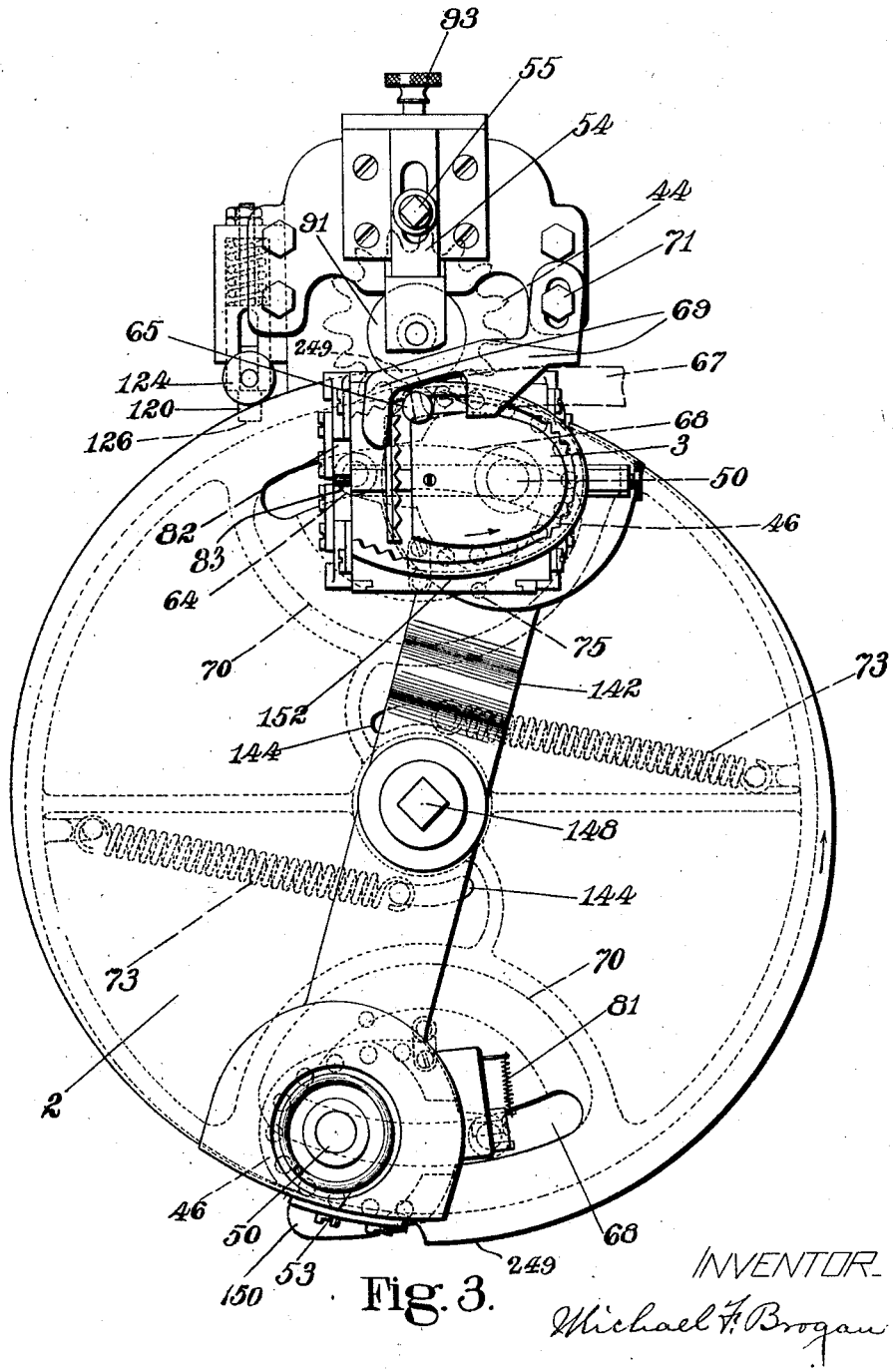

INVENTOR.
Michael F. Brogan

Patented Jan. 27, 1925.

1,524,166

UNITED STATES PATENT OFFICE.

MICHAEL F. BROGAN, OF LAWRENCE, MASSACHUSETTS, ASSIGNOR TO UNITED SHOE MACHINERY CORPORATION, OF PATERSON, NEW JERSEY, A CORPORATION OF NEW JERSEY.

MACHINE FOR INSERTING FASTENINGS.

Application filed January 9, 1918, Serial No. 211,006. Renewed June 17, 1924.

*To all whom it may concern:*

Be it known that I, MICHAEL F. BROGAN, a citizen of the United States, residing at Lawrence, in the county of Essex and State of Massachusetts, have invented certain Improvements in Machines for Inserting Fastenings, of which the following description, in connection with the accompanying drawings, is a specification, like reference characters on the drawings indicating like parts in the several figures.

This invention relates to machines for inserting fastenings, and in particular to machines for attaching rands to heels.

Under former practices it has been usual in attaching rands to heels to cut rand strips into lengths each of which contains approximately the required amount of material to extend around a heel, and then to present the heel and rand by hand to a suitable nailing or stapling mechanism by the operation of which heel and rand were secured together. This practice was objectionable because it was found to be practically impossible to cut each rand piece the exact length required for an average heel, and hence it was necessary to cut the strips in lengths somewhat greater than those actually required, the surplus rand material being subsequently cut off. Much material was accordingly wasted under this practice. The practice just described was further found objectionable in that it involved a number of separate operations which were performed manually, in order to cut the rand, assemble it upon the heel and present it to the fastening securing means.

The present invention has for an important object the provision of a machine which will obviate the necessity of previously cutting each rand of an excessive length in order to provide sufficient material for an average heel, with the consequent waste of material when the surplus stock is cut off. In furtherance of this object, the machine provides novel mechanism for feeding to each heel a continuous strip of randing material and for attaching the strip to the heel while the edge of the strip is being fitted to the outline of the heel. When the operation of attaching the rand strip to the heel is completed, the strip is cut off, so that only that amount of material is used which is required for each heel.

Preferably a movable work support is provided for moving the heels in succession to present each in turn to the rand attaching means. From one standpoint then, the invention may be said to comprise, in a machine having means for attaching a continuous rand strip to heels and a movable work support, the provision of means for holding heels and for moving them successively to present each heel in turn to the rand attaching means.

The invention includes, as a further important feature, means for positively imparting feeding movements to the heel carriage or support in such manner that the rand is laid with accuracy and precision around the edge of the heel, the heel being fed step-by-step, in a direction agreeing with its contour, while the fastenings are driven between the feeding steps, as each successive portion of the rand is presented to the fastening inserting mechanism. The means for so feeding the heel relatively to the fastening inserting mechanism is preferably constructed and arranged automatically to reverse the movement which was imparted to the heel and to restore the latter to its original position at the completion of each randing operation. In a practical form of the invention, at the same time that the heel is so restored it is automatically released from the heel clamping devices.

Another important feature of the invention is comprised in a work table or support having a plurality of heel clamping devices thereon, each set of devices being constructed and arranged to receive and hold a heel, and to guide the heel properly with reference to the fastening inserting devices during the operation of attaching a rand strip to the heel. The heel holding devices referred to are preferably located at diametrically opposite points on the work table whereby the operator, as he stands in front of the machine, is enabled to insert a heel in the holder which is nearest to him on the table, while the machine operates to attach a rand to the heel carried by the holder on the opposite side of the table. Conveniently the table is supported for pivotal movement about its center, and as soon as the randing operation is completed upon the heel in one holder, the operator may turn the table so as to present the heel in the other holder to the operation of the randing devices, and the same operation will place immediately in front of the operator the heel to which a rand has been attached. This heel may then be removed from its holder, and a new heel inserted therein preparatory to repeating the operations described. This feature of the invention results in a great economy of time in inserting heels in the machine, in presenting them to the randing mechanism, and in removing from the machine heels to which rands have been attached.

Other features of the invention of importance are found in improved mechanism which enables successive heels to be randed very rapidly, and with a minimum amount of manipulation on the part of the operator. This mechanism is automatic, and requires from the operator no further attention than the depression of the starting treadle, and the placing of a heel in one heel holder and the removal of a randed heel from the other holder, for each complete operation. The invention contemplates also a novel organization in which a plurality of work holders on a rotatable table are presented successively to a fastening inserting means and moved while in operative relation to the inserting means in such manner as to position the work on the work holders to receive fastenings in a predetermined relation to the edge contour of the work.

While the invention is shown embodied in a rand attaching machine, it will be understood that various important features of the fastening inserting and work presenting means may have other and independent applications and uses. The several features of the invention will be more fully described hereinafter, in connection with the accompanying drawings, illustrating a preferred embodiment of the invention, and in which:

Fig. 2 is an enlarged side elevation, illustrating the principal elements of the mechanism for feeding the work relatively to the tacking mechanism;

Figure 3 is a plan view, illustrating the work table, and showing also one of the heel holders on the table;

Figure 4 is a detail view illustrating, in side elevation, certain portions of the feeding mechanism, and of the devices for releasing the clutch;

Fig. 8 is a detail of the clutch controlling mechanism.

Figure 1:
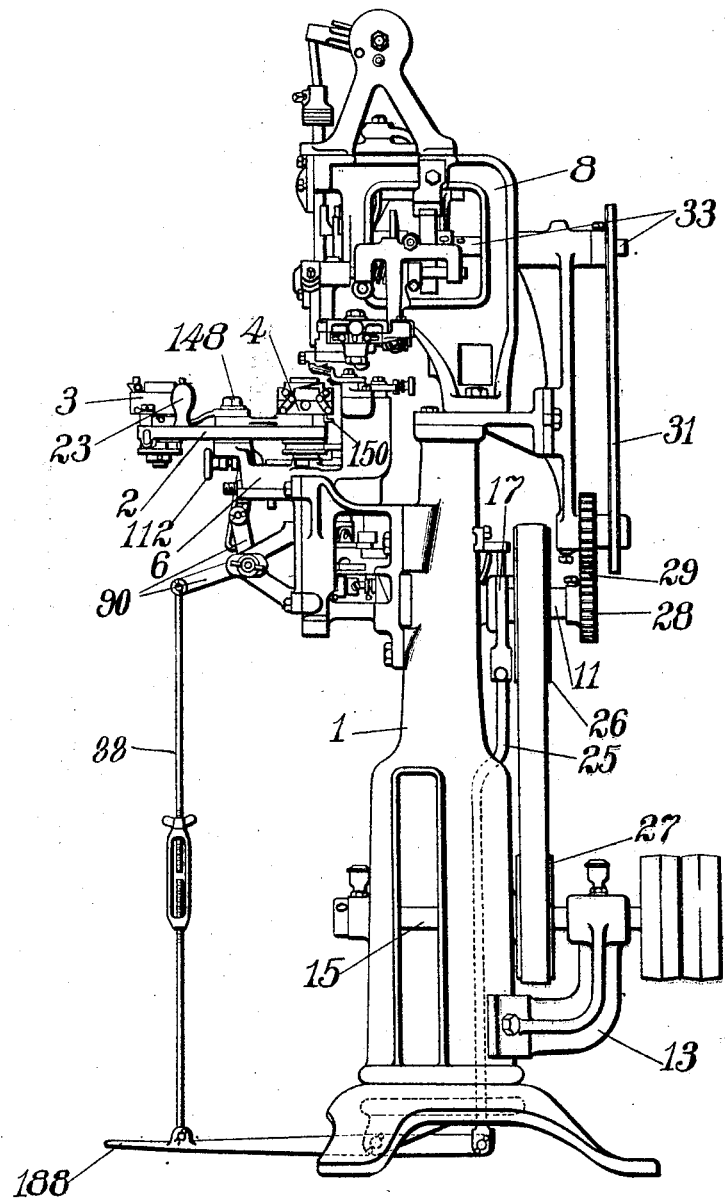
Fig. 1 is a side elevation of a machine embodying the present invention.
Figure 5:
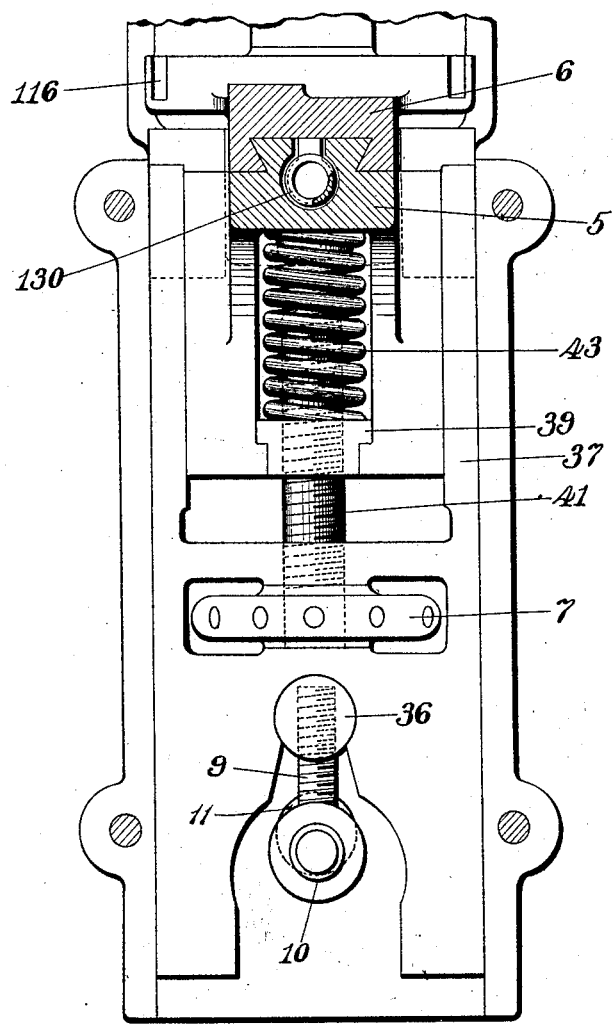
Figure 5 is a vertical sectional view on the line 5—5, Figure 2, looking in the direction of the arrow.
Figure 7:
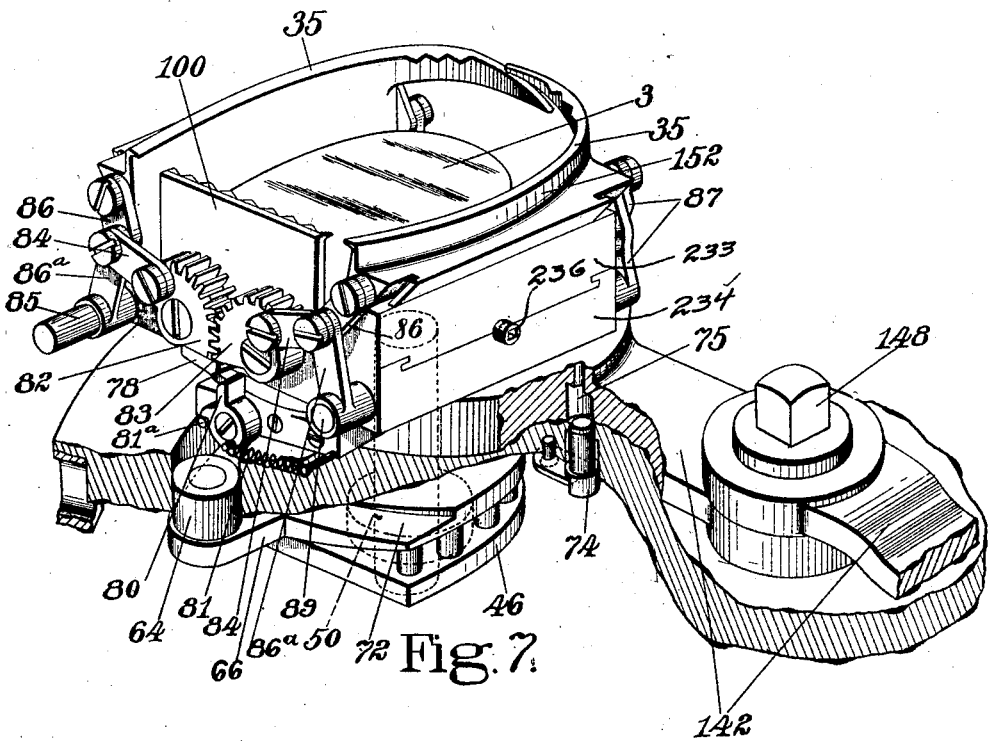
Figure 7 is an enlarged perspective view, partly sectional, illustrating one of the heel holders and portions of the work table and heel holder supporting arm.
Figure 6:
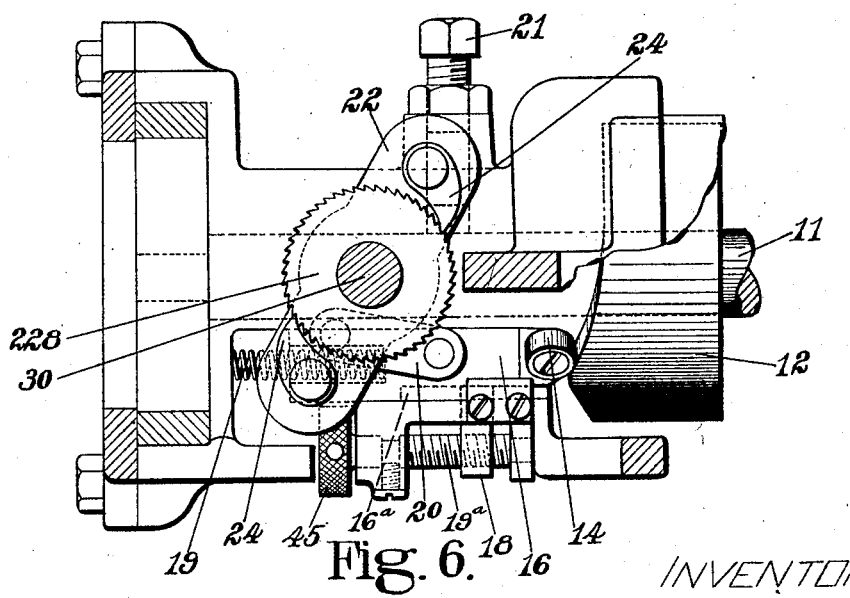
Figure 6 is a sectional plan view on the line 6—6, Figure 2.

The machine frame comprises a base 1 having thereon a head 8, the latter supporting the tacking mechanism. The base 1, and a bracket 13, rigid therewith, contain bearings for a main power shaft 15, having thereon tight and loose pulleys, and adapted to receive power from any suitable source. Above the shaft 15 the frame base carries bearings for a counter shaft 11. The shaft 15 is provided with a tight pulley 27 carrying a belt which likewise is carried by a pulley 26 which is normally loose upon the shaft 11. The shaft 11 is provided with a clutch 17, connected through a rod 25 with a treadle lever 188 which is suitably fulcrumed in the frame base 1. This clutch may be of any suitable design and is preferably constructed so that when the treadle is depressed the loose pulley 26 is clutched to the shaft 11 and said shaft will then be rotated and the machine started, and when the treadle is released the loose pulley will be unclutched from the shaft 11 and the shaft 11 with the machine parts which are operated thereby will be brought to rest.

The shaft 11 carries a gear 28 which meshes with a gear 29, the latter being carried by a shaft having bearings in a bracket which is rigid with the frame of the machine, said shaft carrying also a pulley from which extends a belt 31, said belt passing over a second pulley which is carried by a shaft 33 which rotates in bearings carried by the machine head 8. The shaft 33 serves to operate suitable mechanism for feeding and driving the tacks, or similar fastenings, which are employed to secure the rand to the heel, the machine being so organized that a single tack is fed into position and driven into the work at each cycle of operation of the machine. The mechanism for supplying and driving the fastenings may be of any approved design, and the same is not described herein, as it forms no part of the present invention.

The tacks which are successively fed from a suitable tack hopper, or other source of supply, into position below the usual tack driver, are driven from a nozzle 65 which is positioned properly for the tacks to be driven, successively, along the edge of a heel for the purpose of uniting a rand to the heel as the latter is fed along, step-by-step, as each fastening is driven.

The shaft 11 operates mechanism for automatically presenting the work in position to receive the succesive fastenings. The automatic movements which are imparted to the work are of two kinds, namely, a vertical reciprocation for moving the work up to and away from the tack nozzle, and a horizontal step-by-step feeding movement of the work for presenting it in position to receive successive tacks. These two motions are so timed relatively to each other that the horizontal feeding movements occur when the work is away from the tacking nozzle, and the work is elevated to engage the nozzle following each feeding movement.

The vertical reciprocations of the work are effected by means of an eccentric pin 10 on the end of the shaft 11. This pin is connected through a suitable eccentric strap with a rod 9 which is screw threaded and adjustably engages a shaft 36 journaled for oscillating movement in a frame 37, mounted for vertical reciprocation in suitable guideways carried by the machine frame. The frame 37 is provided with a recess in which is loosely seated a nut 39, and a stem 41 is in threaded engagement with the nut, and has at its lower portion a hand wheel 7, which latter is keyed to the threaded stem 41 but is held against longitudinal movement in the frame 37. A block 5, which is carried by the frame 37, and is arranged for vertical movement therewith, is supported upon a spiral spring 43, which latter is in turn supported by the nut 39. The block 5 is provided with a dove tail rib which engages a dove tail groove in a slide 6, said connection permitting horizontal movement of the slide 6 on the block 5. The slide 6 supports the work table 2 which is rotatable about a suitable pivot carried by the slide, and said work table sustains the clamps or holders for the heels to which rands are to be attached by the tacking mechanism of the machine. The spring 43 acts yieldingly to sustain the work table 2, and to hold the work against the tacking nozzle 65, the spring yielding to compensate for differences in thickness of the work presented to the tacking mechanism. By rotating the wheel 7 the nut 39 may be raised, or lowered, to adjust the tension of spring 43 in accordance with varying thicknesses of the work, as it will be seen that by this adjustment the limits of the reciprocations imparted to the work table may be changed so as to locate the table at a greater or less distance from the tacking mechanism.

For the purpose of effecting the step-by-step feeding motion of the work in proper time relation to its vertical reciprocations, the shaft 11 is provided with a cam 12, which operates mechanism for intermittently rotating the work feeding shaft 30. A horizontally reciprocating slide 16 is provided with a cam roll 14 which is held yieldingly in engagement with the cam 12 by a spring 19, confined between the bottom of a recess in the slide 16, and a rigid part of the frame. The slide 16 is connected by a link 20 with an oscillating pawl carrier 22 which has bearing upon the shaft 30 and supports two pawls 24, 24, which engage the teeth of a ratchet 228, secured to the shaft 30, so that the reciprocations which are imparted to the slide 16 by the cam will effect oscillations of the pawl carrier, and through the pawls will impart an intermittent rotary movement to the shaft 30. In order to vary the extent of the feeding movements imparted to the shaft 30 by the pawls 24, means are provided for adjusting the length of the reciprocations of the slide 16. Said slide is provided with a longitudinal slot 16ª in which a stop 18 moves adjustably. This stop is threaded upon an adjusting screw 19ª, provided with a handle 45 and mounted for rotary movement in a suitable bracket along-side of the slide 16. The position of the stop 18 in the slot 16ª controls the extent of the reciprocations of the slide 16 by varying the distance that said slide will be forced, by the spring 19, toward the cam 12. An adjustable friction plunger 21 is in threaded engagement with an aperture in the frame which intersects the shaft 11, and by adjusting the plunger so as to cause its end to bear frictionally with more or less force against the shaft said shaft will be prevented from overrunning while the cam roll 14 is on the down stroke of the cam 12. Reverse rotation of the shaft 30 is prevented by a ratchet 32, which is secured to said shaft above the ratchet 228, and a pawl 34 which is carried by a bracket on the frame of the machine and is suitably held in engagement with the teeth of the ratchet 32. The shaft 30 is provided with universal joints 38, 40, to provide for the horizontal sliding movements of the work table 2 while the heels are being rotatably fed by mechanism driven from said shaft, and a shaft 42 is connected with the universal joint 40 and carries at its upper end a gear 44. The shaft 30 may be a split shaft, or otherwise constructed for elongation to compensate for the vertical reciprocations imparted to the work table 2, and the parts carried thereby which are driven from the shaft 30.

The gear 44 is arranged to mesh with either one of two pin racks 46, 46, which are respectively located at opposite sides of the work table 2, below said table, said racks each being composed of a plurality of vertical pins which are confined between two spaced flat members which, with the pins are arranged substantially in conformity with the outline of a heel. Each of the racks 46 is fastened to a shaft 50 which passes through a cam slot 68 in the table 2, and also through an aperture formed near one end of an arm 142, the other extremity of each arm being fitted to turn about a stud 148 which projects from the center of the work table 2. The upper end of each shaft 50 is secured to one of the heel holders 3, 4. Each of these heel holders has two clamping sections 35 for engaging the sides and rear end of a heel, said sections overlapping at the back and being provided with teeth frictionally to engage the heel, and a front section which is likewise provided with teeth to engage the heel breast. The clamping sections are rendered adjustable to accommodate heels of different sizes by being dovetailed into blocks 233 slidably mounted on the base portion 234 of the heel holder and adjustable thereon by a right and left threaded screw 236. The base portion of each heel holder is provided with bearings for a longitudinal shaft 85 which extends longitudinally along one side of the heel holder, and is shown as projecting in front of the breast end portion of the holder to receive a suitable handle by means of which the clamping sections 35 are opened and closed. One of the sections 35 carries at the breast end a pivoted link 86 whose opposite end is pivoted to another link 86ᵃ rigidly connected with the shaft 85, said links constituting a toggle. A link 84 extends from the joint of this toggle to a segmental gear 82, which is pivoted to the breast plate 100 of the heel holder and meshes with another segmental gear 83, also pivoted to the heel holder and connected through a link 84 with the joint connecting two links 86 and 86ᵃ forming a second toggle upon the opposite side of the breast end of the heel holder. The upper link of this toggle has pivotal connection with the other clamping member 35, while the lower link of the toggle is fast upon the projecting end of a shaft 89 which has bearing in the heel holder and extends from end to end thereof parallel with the shaft 85. The shafts 85 and 89 project beyond the rear end of the heel holder, upon opposite sides thereof, and are each connected with one link of two toggles 87, the remaining links of said toggles being pivoted to the rear portions of the clamping members 35, 35. When the shaft 85 is rotated by a suitable handle, (not shown) in one direction the toggles 86, 86ᵃ, at the front end of the holder will, through their geared connections 82, 83, effect simultaneous inward movements of the clamping members 35, 35, to clamp a heel, the shafts 85, 89, at the same time being made to operate the toggles 87, 87, at the rear end of the holder to equalize the movements of the clamping members. Upon a reverse rotation of the shaft 85 the clamping members will be caused to move outwardly to release the heel which has been operated upon by the machine, previous to the insertion of another heel to which a rand is to be attached.

Each of the arms 142 is connected with a rigid part of the work table 2 by a spiral spring 73, said spring being fastened at one end to a stud projecting from said arm and disposed for movement in a segmental slot 144 in the table. The table 2 has provided therein, beneath each heel holder, a cam slot 68 which is formed as the arc of a circle concentric with the stud 148 about which the table turns, and each pin rack 46 carries a rigid lug 66 from which projects a stud carrying a cam roll 64 traveling in the slot 68. The table 2 is also provided beneath each heel holder with a second cam slot 70, which is formed on a curve of a different radius from that of the cam slot 68, but forms with the latter slot a continuous pathway for the cam roll 64. Each pin rack 46 is also provided with a cam surface 72, beneath the heel holder, and a spring pressed plug 74 is movable in a bore in the table 2, and is adapted to be thrust into a recess 75 in the arm 142, when the arm reaches a position which locates the recess in line with the plug and the pin rack 46 has been rotated sufficiently to cause its cam 72 to engage the pin 74, and thrust it into the recess 75.

A pawl 80 pivoted to each arm 142 in the path of rotation of each heel holder, is connected by a spring 81 with a pin carried rigidly by the arm, and is thus normally held in engagement with a stop 81ᵃ. One of the segmental gears 82 carries on its lower edge portion a lug 78 which, when the heel holder is rotated during the operation of attaching a rand to a heel carried by the holder, will engage the upper projecting toothed portion of the pawl and rotate the pawl in a direction to stretch the spring, the pawl returning to its position against the stop 81ᵃ when the lug 78 has passed over it. When the heel holder is rotated reversely, following a rand-attaching operation, the lug 78 will move against the opposite face of the pawl 80, which will be prevented from rotating by the stop 81ᵃ, and the pawl will thereby act to rotate the segmental gears 82, 83 in a direction to straighten the toggles, thereby automatically effecting outward movement of the clamp members 35, and releasing the heel from the holder.

The table 2 is provided with a recess 126, and a spring-pressed bolt 120, which slides in a guideway in the frame of the machine, is arranged to enter said recess and thereby lock the table against rotation when the recess comes into alinement with the bolt. The bolt 120 carries a roller 124 which is in position to be engaged by either one of two cams 150 (Fig. 3), one of which is carried at the end of each lever 142, so that when a cam 150 engages the roll 124 the bolt 120 will be withdrawn from its recess in the table, which latter will be unlocked and free to rotate about its axis.

A guide roll 91 is pivotally supported in a slide 54 carried by the frame of the machine and provided with a slot to receive an adjusting clamp bolt 55, the guide roll being arranged to engage a track 152 formed about the periphery of the clamping members 35, and serving to locate the fastenings the same distance from the edge of the heel throughout the tacking line. It will be clear that the guide member or track 152 serves as a pattern which bears a predetermined relation to the heel holder and to the heel contained therein. Moreover, the pattern is adjustable in size so as to cooperate with the adjustable guide roll 91 in positioning heel-holders and heels of various sizes accurately with respect to the fastening inserting means. Conveniently the pattern is so related to the heel holder as to be adjusted automatically and simultaneously with the adjustment of the heel holder to accommodate various sizes of heels. An adjusting screw 93 has its stem in threaded engagement with the slide 54, and provides for adjusting the guide roll 91 relatively to the tacking nozzle 65 for determining the distance that the fastenings will be driven from the edge of each heel, and the bolt 55 is employed firmly to clamp the slide in its adjusted position. The track 152 and the roll 91 are maintained in engagement by a spring 130 which is located in a bore of the block 5 and is confined between an adjusting screw plug 56, threaded to engage said bore, and a downwardly projecting lug on the slide 6, upon which the table 2 is supported. The spring 130 moves the slide 6 and the table 2 and heel holder thereon yieldingly in a direction to press the heel holder against the guide roll 91, the amount of such yielding pressure being regulated by the screw plug 56. The table 2 is formed at its periphery with outwardly extending cam portions 249 for engagement with a roll 250 journaled in the frame of the machine. The cam portions 249 force the table 2 outwardly against the resistance of the spring 130 when the table is rotated to present a heel to the nozzle 65 thereby spacing the track 152 of the clamping members 35 from the roll 91. By reference to Fig. 3, it will be seen that the cam portions 249 are shouldered off at points such as to permit the table 2 to be moved to carry the track 152 of the clamping members 35 of a heel holder against the roll 91 after the heel has been conveyed beneath the nozzle 65. The cam portions 249 of the table 2 are so constructed as to allow the positioning of the heel beneath the nozzle 65 without engagement of the track 152 with the roll 91 even when the clamping members 35 are expanded to receive a heel of the largest size upon which the machine is designed to operate, and the rim of the table 2 is depressed at the shoulders of the cam portions to an extent to permit the track 152 of the heel holder to engage the roll 91 after the heel is positioned beneath the nozzle 65 regardless of the contraction of the clamping members to secure a heel of the smallest size for which the machine is adapted.

The clutch treadle lever 188 is connected by a rod 88 with one arm of a bell crank 90 which is fulcrumed to a bracket 92 carried by the frame, and the other arm of this bell crank carries a pin which plays in a slot in one arm of a second bell crank 96, which is fulcrumed to the slide 6. The other arm of the bell crank 96 is forked and embraces a pin 104 carried by a ratchet plate 108, adapted for co-operation with a pawl 106, pivotally mounted upon the slide 6. The tail of the pawl 106 is pivotally connected with a rod 97 which slides in bearings formed in two lugs projecting from the slide 6, and is provided at its outer end with a handle 112. A spring 98, confined between a rigid collar on the rod 97 and one of the guiding lugs for said rod, serves normally to thrust the rod rearward in a direction to hold the pawl 106 in engagement with the ratchet 108. The slide 6 is provided with a segmental slot 116, see Figs. 4 and 8, which slot is located adjacent to the tail 118 of the pawl 106, and a lever 114 pivotally supported at 115 to the slide 6 is normally projected partially across the slot 116 by a spring 215. The lever 114 is positioned for movement into engagement with the tail of the pawl 106, thereby to move the tooth of the pawl out of operative relation with the ratchet 108. The actuation of the lever 114 for thus operating the pawl is effected by the movement of the lower end of the shaft 50 in the segmental slot 116 at the completion of a rand-attaching operation, as will be more fully described hereinafter. The rack is moved into engagement with the pawl when the treadle 188 is depressed to effect clutching engagement between the shaft 11 and loose pulley 26 and holds the clutch in operative position until the pawl is released from engagement with the ratchet, either automatically by the engagement of the shaft 50 with the lever 114, or, when desired, manually through the instrumentality of the handle 112.

Adjacent to the guide roll 91 is a rand guide 69 which is adjustably secured to the frame of the machine by a screw 71. As shown in Fig. 2 the rand guide has an upwardly extending portion that positions the rand with its thin edge uppermost, so that as the rand is laid along the edge portion of the heel while the latter is being fed with the heel holder into position to receive successive fastenings as they are driven through the tacking nozzle, the thin edge of the rand is above the surface of the heel to which it is being attached. As a result of thus positioning the rand during its attachment to a heel, upwardly extending loops are formed in the thin edge of the rand between the tacks in that portion of the rand which is bent around the rear of the heel. These loops form braces which prevent the thick outer edge of the rand 67 from turning upwardly and away from the heel surface.

The table 2 is provided with a handle 23, see Fig. 1, in order that it may be rotated by the operator, following each complete randing operation to carry the heel to which a rand has been attached away from the tacking nozzle, and to position the other heel holder, into which another heel has been inserted, into operative relation with the tacking nozzle and the rand guide, preparatory to subjecting such heel to the rand attaching operation.

In the use of the machine, a heel is inserted in a heel holder, as 3, and the shaft 85 rotated to actuate the clamping members 35, 35, for immovably securing the heel within the holder. The work table having been moved by the operator to locate the corner of the heel directly under the tacking nozzle, a rand strip 67 is inserted in the rand guide 69 with the end of the strip directly beneath the tacking nozzle and over the corner of the heel in position to receive the first tack, as shown in Fig. 3. At this time the plunger 120 will engage the recess 126 in the table and prevent the latter from rotating. The operator then steps upon the treadle 188, actuating the clutch 17 which clutches the shaft 11 to the rotating pulley 26, thereby starting in operation the tacking mechanism, and the mechanism for imparting the vertical reciprocations to the work table, and the step-by-step feeding movements to the heel holder 3, the mechanisms being so timed that the heel is fed during the downward movement of the table 2. This movement of the treadle to actuate the clutch will also effect, through the connections above described, a downward movement of the ratchet 108 to cause its engagement with the pawl 106, and the operator may then step off of the treadle 188 as the clutch will be held in operative position until the rand is completely tacked to the heel, without further attention upon his part. Movement of the work table by the operator to position the heel holder 3 beneath the tacking nozzle also moved the pin rack 46 of such holder into meshing engagement with the teeth of the gear 44. The step-by-step rotation imparted to the gear 44 will be in turn imparted to the heel holder 3, causing the heel to be fed along after each tack is driven in the operation of securing the rand to the heel. During the first part of the attaching operation, while the rand is being attached along one side of the heel, the arm 142 and heel holder will move together, said arm swinging about the center 148, and the spring 73 will be stretched as the stud connecting said spring with the arm moves along the segmental guide slot 144 in the table 2. During this part of the operation the shaft 50 and cam roll 64 are traveling in the cam slot 68 whose curvature is concentric with the center 148. This far, the feeding movements imparted to the work holder will be sufficient to lay the rand along one side of the heel to the point where the curvature of the rear end of the heel begins. Further movement of the gear 44 then causes the cam roll 64 to travel into the cam groove 70, at which time the movement of the arm 142 is arrested, and the heel is revolved about the shaft 50 as a center while the rand is being laid upon the curved rear end portion of the heel, with which said shaft 50 is concentric. At or about the time that the cam roll 64 passes from the cam groove 68 into the cam groove 70 the lug 78 upon the segmental gear 82 passes over the pawl 80, but without effect upon the clamping members as said pawl is simply rotated idly against the stress of the spring 81, and is immediately returned by the spring into position against the stop pin 81ª when the lug has passed over the pawl. When the cam roll 64 has traveled for a short distance in the cam groove 70 the cam surface 72 engages the pin 74 and moves it into the recess 75 in the arm 142, thus locking the arm to the work table while the cam roll travels that portion of the cam groove 70 which is directly in line with the centers 148 and 50. When the rand has been laid upon the curved rear portion of the heel and tacked thereto, further rotation of the gear 44 moves the cam roll 64 out of the cam groove 70 and into the groove 68 again at the opposite end thereof from that out of which the roll moved when it entered the groove 70. On or about the time that the rand is laid about the curved rear portion of the heel, the cam 72 passes from beneath the spring pressed pin 74, thus permitting said pin to be retracted by its spring from the recess 75 in the arm 142, and unlocking said arm from the table 2. The arm cannot, however, be retracted at this time because of the engagement between the gear 44 and the pin rack 46. Further feeding movement of the heel holder after the cam roll has passed from the groove 70 to the groove 68 will cause the rand to be laid along the other side of the heel, and the feeding movements of the work holder, as well as the operation of the tacking mechanism, will continue until the rand has been tacked up to the corner formed by the heel breast and the side of the heel. At just about this time in the operation of the machine the cam 150 on the arm 142 will engage the roller 124 and force the spring pressed bolt 120 out of the recess 126 in the table, thereby releasing the table. The spring 73 having been put under tension when the arm 142 was swung to the left from the position shown in Fig. 3, as soon as the table is unlocked it will be caused to revolve by said spring in the direction of the arrow, Fig. 3 until the cam roll 64 arrives at the end of the slot 68. During the movement of the table under the action of the spring 73 the former attains sufficient momentum by the time the end of the cam groove reaches the cam roll to swing the arm 142 a sufficient distance to cause the pin rack 46 to disengage the teeth of the gear 44. As soon as the gears 46 and 44 are out of engagement, the heel holder 3 will be rotated in a direction the reverse of that in which it had been rotated by the gear 44, by a spiral spring 53 which connects the heel holder with its supporting arm 142. This reverse rotation of the heel holder will cause the lug 78 to engage the upper toothed portion of the pawl 80 upon that side of the pawl opposite that upon which the pin 81ᵃ is located, and as the pawl will not yield rotation of the gears 82, 83 will be effected in a direction to straighten the toggles and separate the clamping members 35, 35 thus releasing the randed heel from its holder. At the completion of the randing operation the rand strip 67 is cut off close to the breast line of the heel. Following the several operations of the machine as above described the lower end of the shaft 50 traveling in the segmental slot 116 in slide 6 engages the lever 114, which in turn strikes the tail 118 of the pawl 106, thus releasing the ratchet 108 and allowing the clutch treadle to rise and permit the clutch 17 to be moved by its usual clutch spring into position for unclutching the loose pulley 26 from the shaft 11, thereby bringing the machine to rest.

During the operation of attaching a rand to a heel as above described, the operator inserts a heel in the heel holder 4 which is nearest to him at that time, and actuates the clamping members 35, 35 of this heel holder so as to clamp the heel firmly thereto. Upon completion of the randing operation on the other heel, the operator imparts a one-half rotation to the table which brings the heel having the rand attached thereto in front of him and carries the heel to which a rand is to be attached into proper position beneath the tacking nozzle 65.

If at any time during the randing operation necessity arises for stopping the machine before the rand is completely attached, the handle 112 may be manipulated for releasing the pawl 106 from engagement with the ratchet 108, thereby permitting the clutch to move into inoperative position.

While the present invention is herein shown and described in connection with mechanism for attaching rands to heels, many of its features are not necessarily confined to use with such mechanism, but are obviously capable of being employed in other types of machines for operating upon heels.

Having thus described my invention, what I claim as new and desire to secure by Letters Patent of the United States is:

1. In a machine of the class described, means for attaching a continuous rand strip to a heel, a movable work support having means for gripping a heel, and means operatively connected to the gripping means for moving the heel to present it to the rand attaching means.

2. In a machine of the class described, means for attaching a rand strip to a heel, and means for presenting a heel to the attaching means comprising a supporting member, a heel holder carried by said member, means for operating the heel holder, and means separate from the supporting member for guiding the holder in a path corresponding approximately to the contour of a heel.

3. In a machine of the class described, means for attaching a rand strip to a heel, and means for presenting a heel to the attaching means comprising a supporting member, a heel holder carried by said member, means for operating the heel holder, a plurality of spaced members depending from said holder, and means constructed and arranged to co-act with said members to guide the holder in a path corresponding approximately to the contour of a heel.

4. In a machine of the class described, means for attaching a rand strip to a heel, and means for presenting a heel to the attaching means comprising a supporting member, a heel holder carried by said member, means for operating the heel holder, and means for guiding the holder relatively to which the holder is bodily movable to carry the side of a heel past the attaching means and including means for causing fulcruming movement of the holder relatively to the guiding means to carry the curved back of a heel past the attaching means.

5. In a machine of the class described, means for attaching a rand strip to a heel, and means for presenting a heel to the attaching means comprising a supporting member, a heel holder carried by said member, means for guiding the holder in a path corresponding approximately to the contour of a heel including spaced connections between the holder and the guiding means comprising a member depending from the holder, and means co-acting with said member to operate the holder.

6. In a machine of the class described, the combination with means for guiding a continuous strip of rand material, fastening inserting means, and a movable work support having a plurality of independent heel holders arranged to be presented successively to said guiding and fastening-inserting means, one of said holders being stationary for the insertion of a heel while another heel is being operated upon.

7. In a machine of the class described, the combination with rand attaching means, of a plurality of separate heel holders mounted independently on a common support and arranged to be presented successively to said means.

8. In a machine of the class described, the combination with rand attaching means, of a movable work support, and a plurality of separate heel holders independently mounted on said support and arranged to be presented successively to said means.

9. In a machine of the class decribed, the combination with rand attaching means, of a rotatable work support, and separate heel holders mounted for independent movement on said support and arranged upon rotation of the support to be successively located in rand attaching relation to said means.

10. In a machine of the class described, the combination with means for supplying a strip of rand material, of fastening inserting means for attaching said material to a heel, a movable work support, and a plurality of heel holders mounted for independent rotation on said support and arranged to be moved successively into appropriate relation to said rand strip supplying and fastening inserting means.

11. In a machine of the class described, the combination with means for supplying and attaching randing material in strip form, of a movable work support having means for supporting a plurality of heels and for successively presenting them to said means, and devices for separately feeding the supporting means for each heel along a path corresponding substantially to the heel contour while the heel is presented to said means.

12. In a machine of the class described, the combination with fastening inserting mechanism, of a movable work table, a plurality of separate heel holders thereon, means for guiding each heel holder in a path corresponding approximately to a heel outline, and actuating means to cause each holder to move in said path when it is positioned in operative relation to said mechanism.

13. In a machine of the class described, the combination with means for supplying and attaching rand material in strip form, of a movable work table, heel holders independently supported thereon, means for guiding each heel holder in a path corresponding approximately to the heel outline, and actuating means for causing each holder to move in said path when it is positioned in operative relation with the rand attaching means.

14. In a machine of the class described, rand attaching means, and means for presenting a heel to the rand attaching means comprising a supporting member, a holder carried by the supporting member having means for clamping a heel, and means operable by movement of the holder relatively to the supporting member for releasing the heel from the clamping means.

15. In a machine of the class described, a heel holder, means for attaching a rand strip to a heel, a support for the heel holder, means for moving said holder relatively to said support in a path corresponding approximately to the contour of a heel during the rand attaching operation, and means for effecting reverse movement of said holder subsequent to the rand attaching operation.

16. In a machine of the class described, the combination with means for feeding and attaching a rand in strip form, of a heel clamp, means for feeding said heel clamp in a path corresponding approximately to the heel outline during the rand attaching operation, and means for reversing the movement of the heel clamp and for releasing the heel from said clamp at the completion of said operation.

17. In a machine of the class described, the combination with rand supplying and attaching means, of a heel clamp, manually operable means for causing it to engage a heel, means for feeding said clamp in a path corresponding approximately to the heel outline, and means for reversing the movement of the clamp and for releasing the heel at the completion of the rand attaching operation.

18. In a machine of the class described, the combination with rand supplying and attaching mechanism, of a heel clamp, manually operable means for causing it to engage a heel, means for guiding the clamp in a path corresponding approximately to the heel outline, actuating means to cause said clamp to move in said path, and automatic means for disengaging the clamp from said actuating means and for releasing the heel at the completion of the randing operation.

19. In a machine of the class described, the combination with rand supplying and attaching mechanism, of heel holders arranged to be independently presented to said mechanism, each of said holders having heel clamping means, means for feeding a holder relatively to said mechanism during the rand attaching operation, and means acting automatically for disconnecting said holder from said feeding means and for unclamping the heel at the completion of said operation.

20. In a machine of the class described, the combination with rand supplying and attaching mechanism, of heel holders arranged to be independently presented to said mechanism, each of said holders having heel clamping means, mechanism for feeding a holder relatively to said mechanism in a path corresponding approximately to the heel contour, and means acting automatically for disconnecting said holder from said feeding mechanism, for moving said holder reversely along said path, and for unclamping the heel at the completion of the randing operation.

21. In a machine of the class described, the combination with rand attaching mechanism, of a rotatable work table, separate heel holders supported by said table and so arranged that when one holder is presenting a heel in position to have a rand attached thereto another holder is in position to receive a heel, feeding means for moving a holder relatively to said mechanism during the randing operation, and means for automatically moving said holder out of operative relation with said feeding means upon the completion of said operation.

22. A machine of the class described having, in combination, rand supplying and attaching devices, a rotatable work table, separate work holders having heel clamps supported by said table and so arranged that when one holder is presenting a heel in position to have a rand attached thereto another holder is in position to receive a heel, feeding means for moving a holder relatively to said devices during the randing operation, and means for automatically moving said holder away from said feeding means and for actuating its clamp to release the heel in said holder upon the completion of said operation.

23. A machine of the class described having, in combination, rand supplying and attaching devices, a rotatable work table, separate heel holders on said table so arranged that when one holder is presenting a heel to said devices another holder is in position to receive a heel, and means arranged for independent engagement with each holder and for imparting a step-by-step movement to it in a path corresponding approximately to the heel contour for causing a rand strip to be laid thereon during the rand attaching operation.

24. A machine of the class described having, in combination, rand supplying and attaching devices, a rotatable work table, separate heel holders on said table so arranged that when one holder is presenting a heel to said devices another holder is in position to receive a heel, step-by-step feeding means arranged for connection with each holder when the latter is moved into position to present a heel to the rand attaching devices, and means for automatically disconnecting the holder from said means upon completion of each rand attaching operation.

25. A machine of the class described having, in combination, rand supplying and attaching devices, a rotatable work table supporting separate heel holders so arranged that when one heel holder is presenting a heel to said devices another heel holder is in position to receive a heel, feeding means arranged to act on each holder when in rand receiving position, and automatic means to move said holder out of connection with the feeding means and to release the heel from said holder at the completion of a rand attaching operation.

26. A machine of the class described having, in combination, rand supplying and attaching devices, a rotatable work table, heel holders arranged at separated points on said table, and a single feeding means common to said holders, said table being arranged for movement to locate one holder in operative relation to said devices and feeding means while another holder is positioned for receiving a heel.

27. A machine of the class described having, in combination, rand supplying and attaching devices, a rotatable work table, heel holders arranged at separated points on said table each having teeth arranged approximately in the form of a heel contour, and a single feeding means, including a rotatable gear, arranged to mesh with the teeth of each holder when the latter is moved in position to present a heel to said devices while another holder occupies a heel receiving position.

28. A machine of the class described having, in combination, rand supplying and attaching devices, a rotatable work table having a plurality of independent heel holders thereon, step-by-step feeding means arranged for independent connection with each holder when it is moved in position to present a heel to said devices, and means for effecting vertical reciprocations of said work table between said feeding movements.

29. A machine of the class described having, in combination, means for guiding a rand in strip form, fastening mechanism, a rotatable work table supporting heel holders arranged to present heels in succession to said means and mechanism, step-by-step feeding means constructed for operation upon each holder to advance it in a path corresponding approximately to the heel contour after each fastening is driven, and means for imparting vertical reciprocations to said table between the feeding movements.

30. A machine of the class described having, in combination, rand supplying means, fastening inserting mechanism, a heel holder, means operable on said holder to feed the heel in a path approximating the heel contour while attaching a rand thereto, manually controllable means to start the machine, and means controlled by movement of said holder to stop the machine at the completion of a randing operation.

31. A machine of the class described having, in combination, a heel holder, rand supplying means, fastening inserting mechanism for attaching a rand to a heel, means for advancing the heel holder in a path corresponding approximately to the heel contour, a treadle and connections to start the operation of said mechanism and means, and means actuated by the advancing movement of the heel holder to stop such operation.

32. A machine of the class described having, in combination, fastening inserting mechanism, a heel holder, a support for the holder relatively to which the holder is bodily movable, means for advancing said holder in a path corresponding approximately to the heel contour constructed to effect bodily movement of the heel holder on its support, a power-driven shaft for operating said parts, a clutch on said shaft, controlling means therefor comprising a treadle and connections, detent mechanism for holding said clutch in position to cause rotation of the shaft, and means actuable by bodily movement of the heel holder relatively to said support to release the clutch to stop the machine at the completion of an operation.

33. A machine of the class described having, in combination, fastening inserting mechanism, a heel holder, means for advancing said holder in a path corresponding approximately to the heel outline, treadle actuated means for initiating the operation of the fastening inserting mechanism and heel advancing means, means for holding the treadle depressed during said operation, means for releasing the treadle upon the completion of a fastening inserting operation, and resilient means for thereafter returning said heel holder to its initial position.

34. A machine of the class described having, in combination, rand supplying and attaching devices, a rotatable work table, arms pivotally mounted on said table, heel holders supported by said arms, means for guiding said holders in paths corresponding approximately to a heel outline, means adapted for independent connection with each holder for advancing it along said path, a device for locking said table in position to present each heel holder to the fastening mechanism, means for actuating said device to release the table at the completion of a fastening inserting operation, and yielding means connecting said arms with the table arranged to move said table for disconnecting a heel holder from the advancing mechanism.

35. A machine of the class described having, in combination, rand attaching devices, a rotatable work table, pivoted arms carried by said table, heel holders supported on said arms each having clamping members, a cam roll carried by each heel holder, said work table having slots to receive each roll and designed to guide each heel holder in a path corresponding with the heel contour, means constructed for independent operation upon each holder to advance it along said path during the attachment of the rand to a heel, means for locking the table during such operation, means for unlocking the table, yielding means for moving the table to disconnect the heel holder from its advancing mechanism, and means for thereafter reversing the movement of said holder to return it to its original position.

36. A machine of the class described having, in combination, rand attaching devices, a holder for supporting a heel in operative relation to said devices during the randing operation, said holder having independent clamping members, toggles connected with said members, intermeshing gears to ensure simultaneous action of said toggles, means permitting manual operation of said toggles to clamp a heel, means for advancing the clamped heel along a path corresponding to the heel outline, means for reversely moving the heel at the completion of a randing operation, and means operating on said gears to actuate said members and release the heel.

37. A machine of the class described having, in combination, rand attaching devices, a heel holder having clamping members, toggles and intermeshing gears for causing simultaneous movement of said members, means permitting manual actuation of said toggles to clamp a heel, means for advancing the holder during the randing operation, means for reversing the movement of said holder at the completion of said operation, and means acting on said gears during said reverse movement to operate the clamping members and release the heel.

38. A machine of the class described having, in combination, rand attaching devices, a rotatable work table, arms pivoted thereon, heel holders carried by said arms and arranged at diametrically opposite points on said table, means arranged for successive operation on each heel holder as it is presented to said attaching mechanism for advancing the holder in a path approximating the heel contour, heel clamping means on each holder, means to lock the table during the randing operation, means for moving the table to disconnect a holder with the advancing means, and means for thereafter automatically unclamping the heel.

39. A machine of the class described having, in combination, rand attaching devices, a heel holder, a support for said holder movable laterally toward and from said rand attaching devices, step-by-step feeding means for moving said holder in a path corresponding to the heel contour, means to impart vertical reciprocations to said holder, mechanism including a treadle and connections to start the operation of said parts, a detent for holding said treadle depressed during said operation, automatic means carried by said support for releasing the treadle to stop the machine at the completion of a randing operation, and means for releasing the treadle to stop the machine at the will of the operator independently of said automatic means.

40. In a machine of the class described, rand attaching means, and means for presenting a heel to the rand attaching means comprising a heel holder, a member for moving the heel holder, means for operating the heel holder, connections between said member and the heel holder for guiding the holder in a path corresponding approximately to the contour of a heel, means for retaining the member in a position to place the heel holder in operative relation to the rand attaching means, and means movable with the holder for rendering the retaining means inoperative.

41. In a machine of the class described, rand attaching means, and means for presenting a heel to the rand attaching means comprising a heel holder, means for moving the holder, means for retaining said moving means in a position to place the holder in operative relation to the rand attaching means, and means for automatically rendering the retaining means inoperative so as to permit the holder to be moved away from the rand attaching means.

42. In a machine of the class described, rand attaching means, means for presenting a heel to the attaching means comprising means for clamping the heel, and means coacting with the clamping means for determining the distance from the edge of the heel at which the rand attaching means operates on the heel.

43. In a machine of the class described, fastening inserting means for attaching a rand strip to a heel, a heel holder mechanism co-acting with the heel holder to determine the spacing of the fastening from the edge of the heel, a support for the heel holder operable to move the holder to present the heel to the fastening inserting means, and means for controlling the support comprising a member operable on the support to maintain the holder away from said mechanism until the heel is moved into operative relation with the fastening inserting means.

44. In a machine of the class described, fastening inserting means, a work supporting table, a plurality of holders for work mounted on said table and adapted to be brought into co-operative relation with respect to the inserting means by movement of the table, and means for moving each individual holder when in operative relation to the inserting means bodily along a curved path so that fastenings may be inserted equidistantly in spaced relation with respect to a curved edge portion of the work.

45. In a machine of the class described, fastening inserting means, a work supporting table rotatable to position different portions of its circumference beneath the fastening inserting means, work holders mounted on the table, and means for moving each individual work holder about a plurality of centers in presenting different portions of the work in position beneath the inserting means.

46. In a machine of the class described, fastening inserting means, a rotatable work supporting table, work holders mounted on the table and arranged to be brought successively into co-operative relation with respect to the fastening inserting means upon rotation of the table, and means for rotating each individual holder when in co-operative relation with respect to the fastening inserting means both about its own axis and about the axis of the table in presenting the various portions of the work for the insertion of fastenings.

47. In a machine of the class described, fastening inserting means, a work table rotatable to present different pieces of work successively in operative relation to the fastening inserting means, work holders mounted on the table designed to present work of an irregular shape for the insertion of fastenings, and means for moving each work holder when in operative relation to the fastening inserting means along a path corresponding to the irregular shape of the work for the insertion of fastenings along peripheral portions of the work.

48. In a machine of the class described, fastening inserting means, a substantially horizontally rotatable work supporting table, means for presenting a heel to the inserting means comprising a heel holder mounted on the table, and means for guiding and turning the heel holder independently of the table so as to present various portions of the heel in the line of fastening insertion.

49. In a machine of the class described, fastening inserting means, a rotatable work supporting table, a plurality of work holders mounted on the table and each adapted to receive a heel, a guide member arranged to contact with a peripheral portion of the heel holder when the latter is in operative relation to the fastening inserting means, and means for moving the heel holder and for holding it constantly in contact with the guide member so that fastenings are inserted at a predetermined distance from the edge of the work.

50. In a machine of the class described, fastening inserting means, a work supporting table, work holders mounted on the table and arranged to be positioned by movement of the table successively in co-operative relation with respect to the fastening inserting means, means for automatically operating each work holder so as to present different portions of the work in the line of fastening insertion, means for clamping the work on the work holder, and means for automatically releasing the work at the end of the fastening inserting operations.

51. In a machine of the class described, fastening inserting means, a work supporting table, a plurality of heel holders mounted on the table in such position that they may be presented successively in operative relation with respect to the fastening inserting means, power means for turning the heel holder so as to present successive portions of the heel in the line of fastening insertion, said power means being mounted in the frame of the machine independently of the table, the arrangement being such that the heel holder is brought into operative relation with the power means when it is positioned in co-operative relation with the inserting means, and means for automatically releasing the holder from its moving means at the end of fastening inserting operations.

52. In a machine of the class described, fastening inserting means, a rotatable work supporting table, a plurality of holders for heels mounted on the table in such manner that they may be successively presented to the fastening inserting means by movement of the table, means for clamping the heel in the heel holder, means for turning the heel so as to present successive portions in the line of fastening insertion, and means for automatically stopping the insertion of fastenings and for unclamping the heel in the holder.

53. In a machine of the class described, fastening inserting means, a work supporting table, a plurality of heel holders mounted on the table in such manner that they may be presented successively in co-operative relation with respect to the inserting means upon movement of the table, said holders being adjustable to accommodate heels of various sizes, a guide member arranged to engage each holder when in co-operative relation with respect to the fastening inserting means, means for yieldingly holding the heel holder against the guide member whereby heels of various sizes may be positioned properly with respect to the inserting means, and means for moving the heel holder to present various portions of the heel successively in the line of fastening insertion.

54. In a machine of the class described, fastening inserting means, a work supporting table, a plurality of holders for work mounted on said table and adapted to be brought into co-operative relation with respect to the inserting means by movement of the table, and means comprising a pattern for moving each individual holder when in operative relation to the inserting means bodily along a predetermined path so that fastenings may be inserted equidistantly in spaced relation with respect to an edge portion of the work.

55. In a machine of the class described, fastening inserting means, a work supporting table rotatable to position different portions of its circumference beneath the fastening inserting means, work holders mounted on the table, and a pattern associated with each work holder for guiding the work holder along a predetermined path during rotation thereof in presenting different portions of the work in position beneath the inserting means.

56. In a machine of the class described, fastening inserting means, a rotatable work supporting table, work holders mounted on the table and arranged to be brought successively into co-operative relation with respect to the fastening inserting means upon rotation of the table, means comprising a pattern for moving each individual holder along a predetermined path with respect to the fastening inserting means, and means for simultaneously adjusting the holder and the pattern to size.

57. In a machine of the class described, fastening inserting means, a work table rotatable to present different pieces of work successively in operative relation to the fastening inserting means, work holders mounted on the table designed to present work of an irregular shape for the insertion of fastenings, a pattern for controlling the path of movement of each work holder, and means for moving each work holder when in operative relation to the fastening inserting means along the path controlled by the pattern for the insertion of fastenings along peripheral portions of the work.

58. In a machine of the class described, fastening inserting means, a rotatable work supporting table, means for presenting a heel to the inserting means comprising a heel holder, a pattern for guiding the heel holder so as to present various portions of the heel in the line of fastening insertion, and a single means for adjusting the heel holder and the pattern to size.

59. In a machine of the class described, fastening inserting means, a rotatable work supporting table, a plurality of work holders mounted on the table and each adapted to receive a heel, a guide member bearing a predetermined relation to the inserting means, a guide member having a fixed relation to the heel holder and adapted to co-operate with the first-mentioned guide-member, and means for moving the heel holder and for holding the guide members in contact with each other so that fastenings are inserted at a predetermined distance from the edge of the work.

60. In a machine of the class described, fastening inserting means, a work supporting table, work holders mounted on the table and arranged to be positioned by movement of the table successively in co-operative relation with respect to the fastening inserting means, means for automatically turning each work holder so as to present different portions of the work in the line of fastening insertion, and means for automatically turning the work holder in the reverse direction.

61. In a machine of the class described, fastening inserting means, a work supporting table, a plurality of heel holders mounted on the table in such position that they may be presented successively in operative relation with respect to the fastening inserting means, power means for turning the heel holder so as to present successive portions of the heel in the line of fastening insertion, and means for guiding the heel holder during turning movement thereof comprising a guide roll on the machine frame and spring means for moving the table toward the guide roll to hold the heel holder against said guide roll.

62. In a machine of the class described, fastening inserting means, a rotatable work supporting table, a plurality of holders for heels mounted on the table in such manner that they may be successively presented to the fastening inserting means by movement of the table, means for clamping the heel in the heel holder, means for turning the heel so as to present successive portions in the line of fastening insertion, and spring means for automatically turning the heel in the reverse direction.

63. In a machine of the class described, fastening inserting means, a work supporting table, a plurality of heel holders mounted on the table in such manner that they may be presented successively in co-operative relation with respect to the inserting means upon movement of the table, the construction being such as to accommodate heels of various sizes, a heel-shaped pattern associated with the heel holder, a guide member arranged to engage the pattern when the heel holder is in cooperative relation with respect to the fastening inserting means, means for yieldingly holding the pattern against the guide member whereby heels of various sizes may be positioned properly with respect to the inserting means, and means for moving the heel holder to present various portions of the heel successively in the line of fastening insertion.

64. In a machine of the class described, fastening inserting means, a work table rotatable to position different portions of its circumference beneath the fastening inserting means, work holders mounted on the table, a guide member located below the plane of the inserting means, and a pattern associated with each work holder and arranged to contact with the guide member for guiding the work holder along a predetermined path during rotation thereof, the construction and arrangement being such that a holder and a pattern of a different size may be readily substituted for cooperation with the guide member and fastening inserting means.

65. In a machine of the class described, means for attaching a continuous rand strip to a heel, a movable work support having means for holding a heel, and means operatively connected to the holding means for moving the heel independently of the work support to present it to the rand attaching means.

66. In a machine of the class described, means for operating about the periphery of a heel, means for presenting a heel to the operating means comprising a supporting member, work gripping means carried by said member, mechanism for moving the gripping means to present the periphery of the heel to the operating means, and means separate from the supporting member for guiding the gripping means in a path corresponding approximately to the periphery of the heel as the operation is performed.

67. In a machine of the class described, means for operating upon heels, a rotary work support, a clamp for gripping a plurality of heels at points remote from the center of the work support, and means for moving the heels relatively to the work support to present different portions thereof to the operating means.

68. In a machine of the class described, a heel holder, means for successively inserting fastenings in heels carried thereby, a support for the heel holder, means for moving said holder relatively to said support, between the insertion of successive fastenings, in a path corresponding approximately to the contour of a heel, and means for effecting reverse movement of said holder after the conclusion of the insertion of fastenings.

69. In a machine of the class described, fastening inserting means, means for presenting a heel to the fastening inserting means comprising a clamp for gripping the heel, means co-operating with the clamp for positioning the fastenings with respect to the edge of the heel, and a guide for conducting a rand strip to fastening inserting position.

70. In a machine of the class described, means for performing an operation about the periphery of heels, means for presenting heels to the operating means comprising a heel-gripping clamp, means co-operating with the clamp for positioning heels with respect to the operating means and a cam formed and arranged to control the presentation of the clamped heels to the operating means.

71. In a machine of the class described, the combination with fastening inserting means, of a plurality of separate heel holders mounted for independent movement on a common support and arranged to be presented successively to said means.

72. In a machine of the class described, the combination of fastening inserting means, a movable work support, and a plurality of separate heel holders mounted on the support for independent movement and arranged to be presented successively to said means.

73. In a machine of the class described, the combination with fastening inserting means, of a rotatable work support, and separate heel holders mounted for independent movement on said support arranged upon rotation of the support to be successively brought into fastening inserting relation to said means.

74. In a machine of the class described, the combination with fastening inserting means, of a movable work support and a plurality of heel holders mounted for independent rotation on said support and arranged to be brought successively into operative relation to said fastening inserting means.

75. In a machine of the class described, the combination with means for operating about the periphery of a heel, of a heel clamp, means for moving said heel clamp in a path corresponding approximately to the outline of the heel during the operation, and means for reversing the movement of the heel clamp after the conclusion of the operation.

76. In a machine of the class described, the combination with means for inserting fastenings about the periphery of a heel, of a heel clamp, means for moving said heel clamp in a path corresponding approximately to the contour of the heel as the fastenings are inserted, and means for reversing the movement of the heel clamp after the conclusion of the insertion of fastenings.

77. In a machine of the class described, the combination with fastening inserting means, of a heel clamp, means for causing the clamp to grip a heel, means for moving the clamp in a path corresponding approximately to the contour of the heel as the fastenings are inserted, and means for reversing the movement of the clamp and for releasing the heel after the conclusion of the insertion of fastenings.

78. A machine of the class described having, in combination, fastening inserting means, a rotatable work support, separate work holders having heel clamps carried by said support and so arranged that when one holder is presenting a heel in position for the insertion of fastenings another holder is in position to receive a heel, feeding means for moving a holder relatively to the fastening inserting means between the insertion of successive fastenings, and mechanism for moving the holder away from the feeding means and for actuating its clamp to release the heel in the holder after the completion of the insertion of fastenings.

79. A machine of the class described having in combination, fastening inserting means, a rotatable work support, separate heel holders on said support so arranged that when one holder is presenting a heel to the fastening inserting means another holder is in position to receive a heel, and means arranged for independent engagement with each holder while in fastening inserting position for imparting a step-by-step movement to it in a path corresponding to the contour of the heel, the heel thus being fed relatively to the fastening inserting means to cause the insertion of a row of fastenings about the periphery of the heel.

80. A machine of the class described having, in combination, fastening inserting means, a heel holder, means to move said holder, a cam formed and arranged to cause the movement of said holder to conform to the contour of a heel to cause the insertion of a row of fastenings about the periphery of the heel, manually controllable means to start the machine, and means controlled in accordance with the movement of said holder to stop the machine after the conclusion of the insertion of a row of fastenings.

81. A machine of the class described having, in combination, fastening inserting means, a rotatable work support, an arm pivoted to said support, a heel holder carried by said arm and provided with heel clamping members, a cam roll carried by said heel holder and positioned in a slot in said work support to guide the heel holder in a path corresponding to the contour of a heel, means arranged to operate upon the heel holder to advance it along said path between the insertion of fastenings, means for locking the work support during the insertion of a series of fastenings, means for unlocking the work support at the conclusion of the insertion of a series of fastenings, and means for thereafter reversing the movement of the holder to return it to its original position.

82. A machine of the class described having, in combination, fastening inserting means, a rotatable work support, a plurality of arms pivoted thereto, a heel holder carried by each arm, means arranged to operate successively on the heel holders as they are presented to the fastening inserting mechanism for advancing each holder in a path conforming to the contour of a heel, heel clamping means on each holder, means to lock the work support during the insertion of fastenings, means for moving the work support after the insertion of a series of fastenings to transfer the heel into which fastenings have been inserted from fastening inserting position, and means for thereafter unclamping the heel.

83. In a machine of the class described, means for operating about the periphery of a piece of work, a work support rotatable to position different portions of its circumference beneath the operating means, a work holder mounted adjacent to the periphery of the support, and means for moving said holder about a plurality of centers to present different portions of the work to the operating means.

84. In a machine of the class described, the combination with means for operating about the periphery of a heel, of a rotary work support, a heel clamp remote from the center of rotation thereof, and means for moving said clamp in a path corresponding to the contour of the heel during the operation.

85. In a machine of the class described, means for inserting a series of fastenings about the periphery of a heel, and means for presenting a heel to the fastening inserting means comprising a rotatable support, a heel clamp carried by the support and rotatable with respect thereto, and means for moving the heel clamp in a path corresponding to the contour of a heel to present the heel in operative relation to the fastening inserting means.

86. In a machine of the class described, means for operating about the periphery of a heel, a work support rotatable to position different portions of its circumference adjacent to the operating means, a plurality of heel clamps mounted adjacent to the periphery of the support, and means for moving said clamps, when adjacent to the operating means, through a path corresponding to the contour of a heel to present the periphery of a heel to the operating means.

87. In a machine of the class described, in combination, a rotary support, a heel engaging clamp carried thereby, means to operate on a heel engaged by the clamp, and mechanism to move the support to carry the clamp bodily past said means to operate about one side of the heel, then to rotate the clamp to operate about the rear end of the heel and finally to move the support to carry the clamp bodily past said means to operate about the second side of the heel, said mechanism comprising a gear carried by the heel engaging clamp, and a power-driven gear meshing therewith for rotating the clamp as described.

88. A machine of the class described having, in combination, a plurality of heel clamps, a carrier on which said clamps are rotatably mounted, means to operate on a heel in one of the clamps, and mechanism to rotate the carrier to move the clamps bodily with respect to said means, then to hold the carrier stationary and to rotate one of the heel clamps to present the rear portion of the heel to said means, and then further to rotate the carrier to move the clamps bodily, said mechansim comprising an arm carrying a cam roll and a cam having a first portion shaped to prevent said arm from turning to guide the heel clamp in its first bodily motion, a second portion formed on an arc of a circle to permit said arm to turn during rotation of the heel clamp, and a third portion shaped to prevent said arm from turning and arranged to guide the heel clamp in its final bodily motion.

89. A machine of the class described having, in combination, a plurality of heel clamps, a carrier on which said clamps are rotatably mounted, means to operate on a heel in one of the clamps, and mechanism to rotate the carrier to move the clamps bodily with respect to said means, then to hold the carrier stationary and to rotate one of the heel clamps to present the rear portion of the heel to said means, and then further to rotate the carrier to move the clamps bodily as described, said mechanism comprising an arm carrying a cam roll, a cam having a first portion shaped to prevent said arm from turning to guide the heel clamp in its first bodily motion, a second portion formed on an arc of a circle to permit said arm to turn during rotation of the heel clamp, and a third portion shaped to prevent said arm from turning and arranged to guide the heel clamp in its final bodily motion, a power driven gear, and a gear carried by the heel clamp in mesh therewith to accomplish the bodily and relative movements of the heel clamp under the control of said cam.

90. A machine of the class described having, in combination, a rotary support, a heel engaging clamp carried thereby, means to operate on a heel engaged by the clamp, mechanism to move the support to carry the clamp bodily past said means to operate about one side of the heel, then to rotate the clamp to operate about the rear end of the heel and finally to move the support to carry the clamp bodily past said means to operate about the second side of the heel, said mechanism comprising a gear carried by the heel engaging clamp and a power driven gear meshing therewith rotating the clamp as described, and automatic mechanism for releasing the clamp after the completion of the performance of an operation on the heel to permit the ready removal of the heel from the machine.

91. A machine of the class described having, in combination, means for operating about the periphery of a heel, a pair of rotary members movable about a common axis, a heel engaging clamp carried by one of said rotary members and having a cam roll carried by a rigid part thereof, and a cam track formed on the other rotary member and cooperating with said cam roll to cause the heel engaging clamp to rotate first about the axis of rotation of said rotary members, then about an axis substantially coincident with the center of curvature of the periphery of the rear portion of a heel in the heel engaging clamp, and finally again about the axis of rotation of said rotary members to present the different parts of the periphery of the heel successively to the operating means.

92. A machine for applying rands to heel blanks having, in combination, a support for heel blanks, means for guiding randing to a heel blank on the support, a templet formed and arranged to control the configuration of the rand and its relation to the heel blank, and means for securing the rand to the heel blank.

In testimony whereof I have signed my name to this specification.

MICHAEL F. BROGAN.